United States Patent [19]
Taylor

[11] 3,983,201
[45] Sept. 28, 1976

[54] METHOD OF PREPARING A LACQUER COATED REGENERATED CELLULOSE FILM WITH AN INTERMEDIATE LAYER OF HYDROXYALKYL CELLULOSE

[75] Inventor: John S. Taylor, Newark, Del.

[73] Assignee: FMC Corporation, Philadelphia, Pa.

[22] Filed: June 9, 1972

[21] Appl. No.: 261,490

[52] U.S. Cl. .................... 264/129; 156/244; 264/171; 264/189; 264/191; 427/390 R; 427/407 D
[51] Int. Cl.² ............... B29D 7/04; B29D 7/20
[58] Field of Search ........... 264/189, 191, 171, 129; 117/76 F, 76 P, 86, 145; 427/372 R, 390 R, 407 D; 156/244

[56] References Cited
UNITED STATES PATENTS

| | | |
|---|---|---|
| 2,989,798 | 6/1961 | Bannerman .................... 264/171 |
| 3,085,901 | 4/1963 | Lindsey et al. ................ 117/76 F |
| 3,188,234 | 6/1965 | Hahn et al. .................... 117/145 |
| 3,248,466 | 4/1966 | Woodell ....................... 264/189 |
| 3,318,988 | 5/1967 | McDowell ..................... 264/171 |
| 3,448,183 | 6/1969 | Chisholm ...................... 264/171 |
| 3,457,342 | 7/1969 | Parr et al. .................... 264/171 |
| 3,479,425 | 11/1969 | Lefevre et al. ................ 264/171 |
| 3,557,262 | 1/1971 | Mitchell et al. ............... 264/171 |
| 3,652,316 | 3/1972 | Mitchell et al. ............. 117/76 F |
| 3,690,910 | 9/1972 | Mahe et al. ................... 117/145 |

*Primary Examiner*—Jeffery R. Thurlow

[57] ABSTRACT

A method of preparing a composite film having improved adhesion between the coating layer and the base layer wherein a viscose solution and a hydroxyalkyl cellulose solution are coextruded in the form of a composite sheet, coagulated and then coated with a lacquer composition over the hydroxyalkyl cellulose layer.

10 Claims, 1 Drawing Figure

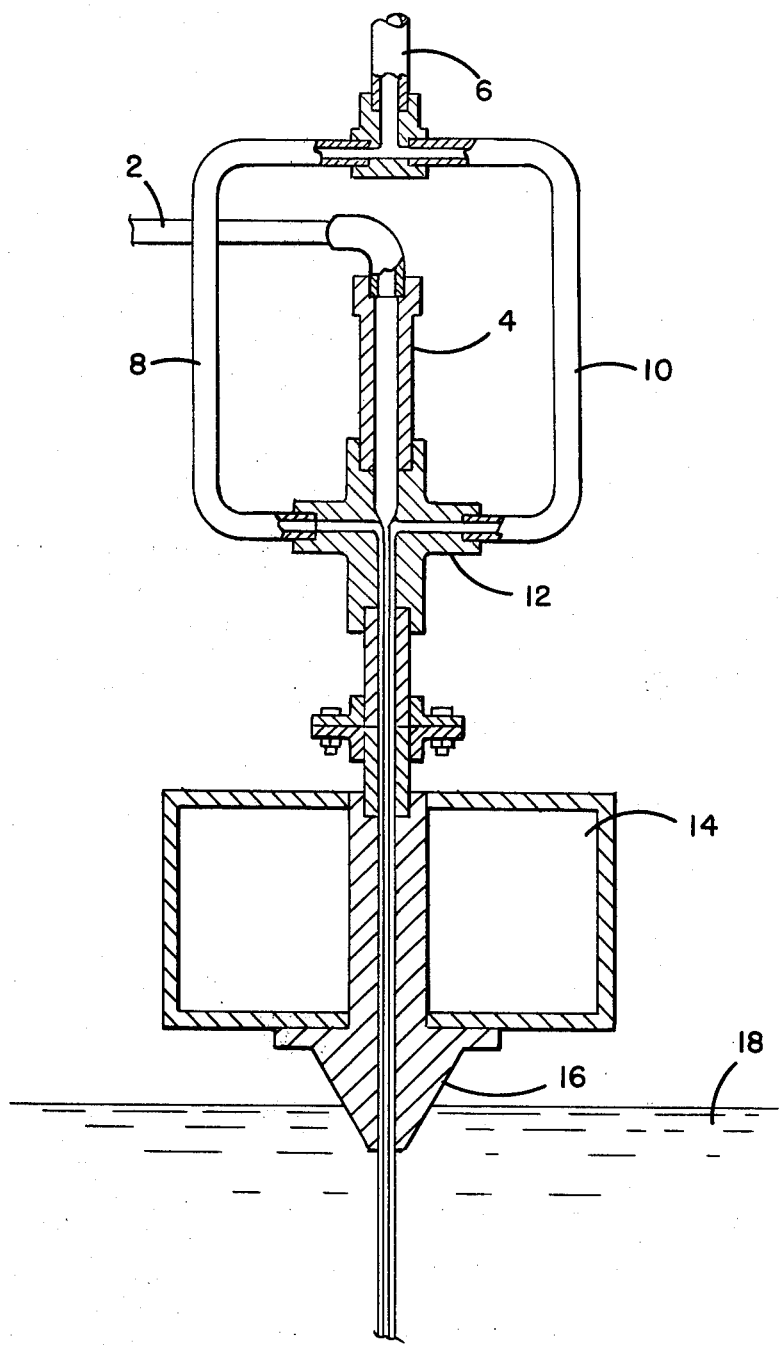

METHOD OF PREPARING A LACQUER COATED REGENERATED CELLULOSE FILM WITH AN INTERMEDIATE LAYER OF HYDROXYALKYL CELLULOSE

Coatings for regenerated cellulose base film prepared from lacquers or volatile organic solvent solutions of thermoplastic film-forming resins, for example, vinyl polymers and copolymers, often suffer from adhesion to the base films after exposure to high humidity conditions.

It is an object of this invention to provide a method for preparing a composite film having improved adhesion between layers of a regenerated cellulose base film, and a thermoplastic resin coating layer, said base and coating having an intermediate layer of hydroxyalkyl cellulose.

The above and other objects are accomplished in accordance with this invention in a method of preparing a composite film which comprises extruding a layer of a film-forming viscose solution with a layer of an aqueous caustic solution of an alkali-soluble, water-insoluble hydroxyalkyl cellulose contiguous to each surface of said viscose layer into a coagulating medium for each solution, drying the resulting composite sheet, coating the hydroxyalkyl cellulose layer with a volatile organic solvent solution of a film-forming thermoplastic resin, and drying the coating solution.

Film-forming viscose solutions are well known and, in general, are formed by reacting carbon disulfide with alkali cellulose and then mixing the resulting sodium cellulose xanthate with dilute sodium hydroxide.

Alkali-soluble, water-insoluble, hydroxyalkyl cellulose ethers are also well known and their preparation is described, for example, in U.S. Pat. No. 2,902,334. Preferred ethers are the hydroxyethyl cellulose and hydroxypropyl cellulose. Film-forming solutions are prepared by dissolving the ethers in aqueous alkaline solutions, preferably sodium hydroxide solutions.

Coagulating mediums for each of the above film-forming solutions include hot inert gas, aqueous acid baths, aqueous baths containing phosphate ions, etc. Typical coagulating baths include 62% water, 13% sulfuric acid and 25% sodium sulfate, or 47% water, 36% phosphoric acid and 17% sodium hydroxide. If desired, the cellulosic layers may be passed through more than one coagulating media. The viscose is at least partially regenerated during passage through the coagulating medium or media.

After coagulation, the wet gel layers may be wet processed and then are plasticized, usually by passage through an aqueous bath containing the plasticizing compound. Plasticizers for these cellulosic materials are well known and include, for example, glycerine, urea, ethylene glycol and polyethylene glycols of various molecular weights.

In the preferred form of this invention, an anchoring material is incorporated in the composite cellulosic film, at least at the surface of the hydroxyalkyl cellulose in order to further improve adhesion between the resin coating and the base. Most advantageously, a water-miscible or water-soluble anchoring agent is incorporated in the plasticizing bath and is incorporated in the film during passage of the cellulosic composite through this bath. Conventional film coating anchoring agents include, for example, melamine-formaldehyde precondensates, urea-formaldehyde precondensates and polyalkyleneimines.

The plasticized composite is dried and coated with a lacquer or volatile organic solvent solution of a film-forming thermoplastic resin. Principal film-forming thermoplastic resins useful for coating film include, vinyl chloride homopolymers and copolymers, vinylidene chloride copolymers (sarans) and nitrocellulose.

Resins of vinyl chloride polymers include homopolymer and copolymers predominantly of vinyl chloride and a copolymerizable monomer or monomers. Some examples of copolymerizable monomers include vinyl acetate, vinyl propionate, vinyl isobutyl ether, alkyl esters of acrylic and methacrylic acid, ethylene, propylene, maleic acid or its anhydride, and the like.

Lacquers are prepared by dissolving the vinyl resin or resin mixture in a volatile organic solvent at a solids concentration of from about 5 to about 25%. Some of the useful solvents and diluents for the lacquer include ethyl acetate, butyl acetate, acetone, methyl ethyl ketone, methyl alcohol, butyl alcohol, etheralcohols, heptane, benzene, xylene, toluene, and mixtures of these. The vinyl resin lacquer may also contain various additives to improve the coating properties including, for example, moistureproofing agents, vegetable oil lubricants, slip agents, blending agents, and the like.

The saran or vinylidene chloride copolymer resin includes copolymers predominantly of vinylidene chloride with a copolymerizable monomer or monomers. The copolymerizable monomers include, for example, acrylonitrile, vinyl chloride, acrylic and methacrylic acid, alkyl esters of these acids, itaconic acid, and those additional monomers mentioned above for the vinyl chloride polymers.

Lacquers of the vinylidene chloride copolymer resins are prepared with solvents including, for example, tetrahydrofuran, methylethyl ketone and the like. Diluents such as toluene, xylene and benzene may also be employed in the lacquer.

As in the case of the vinyl resin lacquer, the saran lacquer may contain additives to improve the coating properties including slip agents, waxes and the like.

Nitrocellulose lacquers are also well known and typical nitrocellulose coating compositions may be seen in U.S. Pat. Nos. 2,888,368 and 2,950,992. Plasticizers, moistureproofing agents, blending agents and other additives are often included in the composition. Solvents include hydrocarbons, ketones, alcohols, ethers and mixtures of these organic liquids.

Other suitable thermoplastic film-forming resin coating materials will be readily known to those skilled in this art.

The method of this invention is not effective for the application of coatings from aqueous dispersions of coating resins as disclosed in U.S. Pat. No. 3,085,901 to Lindsey et al since the method employed herein requires the use of a hydroxyalkyl cellulose ether which has a higher gel swell than the regenerated cellulose base and consequently the application thereto of an aqueous dispersion would be a disadvantage rather than an advantage.

The following example is set forth to demonstrate the method of this invention.

EXAMPLE

As seen in the accompanying drawing, a film-forming viscose solution (9% cellulose) pigmented with titanium dioxide was pumped through line 2 at a rate of 140 grams per minute to form a "rod" of viscose at nozzle 4. 8.5% of dissolved alkalisoluble, water-insoluble hydroxyethyl cellulose ether in a caustic aqueous solution was pumped through line 6 at a rate of 37.5 grams per minute into lines 8 and 10 and converged at cross fitting 12 onto the viscose "rod". The two contiguous solutions passed down through the spinning machine nozzle assembly 14, the stream diverged at 10 inch long slotted nozzle 16 and was extruded as a layer of viscose with thin layers of hydroxyalkyl cellulose solution on each side thereof into an aqueous coagulating bath 18. Bath 18 consisted of 13% sulfuric acid and 25% sodium sulfate.

The composite film was passed from the coagulating bath into an aqueous plasticizing bath containing 7% glycerine and 0.10% of a melamine-formaldehyde precondensate anchoring agent. The film was dried and had a thickness of about 0.9 mil with a width of 4½ inches. Microscopic examination showed a relatively uniform skin or layer of clear hydroxyethyl cellulose upon both sides of the pigmented cellulose base film. The titanium dioxide pigment in the cellulose was present merely to facilitate examination of the layers.

The composite film was coated with a standard vinyl resin lacquer comprising a mixture of 50 weight percent of a resin copolymer of 86% vinyl chloride, 13% vinyl acetate and 1% of maleic acid, and 50 weight percent of a resin copolymer of 87% vinyl chloride and 13% vinyl acetate at a concentration of 18% in a mixture of toluene and butyl acetate as the solvent. After the solvent was evaporated in a drying oven, the film was heat sealed and conditioned at 43% and 75% relative humidity for two days. Because of a laboratory limitation on coating equipment the composite was first coated on one side (outside) and then on the other side (inside).

A control titanium dioxide pigmented viscose was spun into a film without the hydroxyethyl cellulose solution. This film was treated in the same manner as above and coated with the same lacquer.

To demonstrate improved adhesion between the composite and the coating layer, test samples of the coated films were heat sealed together using the following procedure:

Strips of the same test film having a two inch width were placed together, the same coated side facing the same coated side, and a one inch wide strip of the films was heat sealed using a Sentinal Heat Sealer at 20 p.s.i.g. for one second at 275°F. jaw temperature. (Only top jaw heated.) Heat Seal Strength was determined using a Suter Tester at a 180° angle. The force necessary to pull the bonded films apart was measured at each relative humidity (R.H.) level as set forth in the following table.

Table

| Hydroxyethyl Cellulose Clad Base Film | Control Film |
|---|---|
| Heat seal, gms/2" - 43% R.H. | Heat seal, gms/2" - 43% R.H. |
| Outside to outside 317 | 210 |
| Inside to inside 181 | 87 |
| Heat seal, gms/2" - 75% R.H. | Heat seal, gms/2" - 75% R.H. |
| Outside to outside 427 | 365 |
| Inside to inside 280 | 274 |

It can be seen from the above that an improvement in adhesion of over 50% occurred at high humidity with the film prepared with the method of this invention. The difference in the outside and inside heat seal strengths can be explained by the fact that the coatings were applied to the outside first and then the inside. As a result of this, the outside coating was passed through the drying oven twice.

Various changes and modifications may be made in practicing the invention without departing from the spirit and scope thereof and, therefore, the invention is not to be limited except as defined in the appended claims.

I claim:
1. A method of preparing a composite film which comprises extruding a layer of a film-forming viscose solution with a layer of an aqueous caustic solution of an alkali-soluble, water-insoluble hydroxyalkyl cellulose contiguous to each surface of said viscose layer into a coagulating medium for each solution, drying the resulting composite sheet, coating the hydroxyalkyl cellulose layer with a volatile organic solvent solution of a thermoplastic film-forming resin, and drying the coating.
2. The method of claim 1 wherein the coagulated cellulosic solutions before drying are passed through a bath containing a plasticizer for cellulose.
3. The method of claim 1 wherein the coagulated cellulosic solutions are treated with an adhesion promoting amount of an anchoring agent for cellulose films.
4. The method of claim 2 wherein the plasticizer bath contains an anchoring agent for cellulose film in an adhesion promoting amount.
5. The method of claim 1 wherein the hydroxyalkyl cellulose is hydroxyethyl cellulose.
6. The method of claim 1 wherein the hydroxyalkyl cellulose is hydroxypropyl cellulose.
7. The method of claim 1 wherein the thermoplastic film-forming resin is a copolymer of vinyl chloride and vinyl acetate.
8. The method of claim 1 wherein the thermoplastic film-forming resin is a copolymer of vinylidene chloride and acrylonitrile.
9. The method of claim 1 wherein the thermoplastic film-forming resin is a copolymer of vinylidene chloride and vinyl chloride.
10. The method of claim 1 wherein the thermoplastic film-forming resin is nitrocellulose.

* * * * *

UNITED STATES PATENT OFFICE
CERTIFICATE OF CORRECTION

PATENT NO. : 3,983,201

DATED : September 28, 1976

INVENTOR(S) : John S. Taylor

It is certified that error appears in the above-identified patent and that said Letters Patent are hereby corrected as shown below:

Column 1, paragraph 1, line 10, "from adhesion" should read --from poor adhesion--

Signed and Sealed this

Thirtieth Day of November 1976

[SEAL]

Attest:

RUTH C. MASON
*Attesting Officer*

C. MARSHALL DANN
*Commissioner of Patents and Trademarks*